United States Patent
Fricke et al.

(10) Patent No.: US 8,046,406 B2
(45) Date of Patent: *Oct. 25, 2011

(54) SYSTEM FOR DATA LOGGING

(75) Inventors: Volker W. Fricke, Altdorf (DE); Gary Paul Noble, Worcestershire (GB); Wendy Ann Trice, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,786

(22) Filed: Oct. 21, 2009

(65) Prior Publication Data
US 2010/0042683 A1   Feb. 18, 2010

Related U.S. Application Data

(63) Continuation of application No. 10/552,230, filed on Jun. 30, 2006, now Pat. No. 7,610,398.

(51) Int. Cl.
G06F 15/16 (2006.01)
G06F 15/173 (2006.01)
G06F 13/00 (2006.01)
H04L 12/56 (2006.01)

(52) U.S. Cl. ...... 709/203; 709/225; 710/33; 370/395.41

(58) Field of Classification Search .................... 709/203
See application file for complete search history.

(56) References Cited

U.S. PATENT DOCUMENTS

| | | | |
|---|---|---|---|
| 5,732,074 A | 3/1998 | Spaur et al. | |
| 5,844,327 A | 12/1998 | Batson | |
| 5,909,544 A | 6/1999 | Anderson, II et al. | |
| 6,021,433 A | 2/2000 | Payne et al. | |
| 6,263,268 B1 | 7/2001 | Nathanson | |
| 6,493,331 B1 | 12/2002 | Walton et al. | |
| 6,539,231 B1 | 3/2003 | Hamilton et al. | |
| 6,674,804 B1 | 1/2004 | Eshet et al. | |

(Continued)

FOREIGN PATENT DOCUMENTS

EP   1213905 A2   6/2002

(Continued)

OTHER PUBLICATIONS

Notice of Allowance (Mail Date Jun. 12, 2009) for U.S. Appl. No. 10/552,230, filed Jun. 30, 2006, Confirmation No. 6714.

(Continued)

*Primary Examiner* — Ario Etienne
*Assistant Examiner* — Blake Rubin
(74) *Attorney, Agent, or Firm* — Schmeiser, Olsen & Watts; John Pivnichny

(57) ABSTRACT

A data logging system that utilizes a schedule of data transfer periods for transferring data from devices to a server. A communication of an actual data transfer size of stored data in a first device of the devices is obtained by the server from the first device. A corresponding future data transfer size of the stored data is estimated by the server, based on a historic data transfer size for data previously transferred from the first device to the server. The schedule is currently based on the historic data transfer size for the first device. The server updates the schedule if the server has determined that a difference exists between the actual data transfer size and the corresponding estimated future data transfer size. A transmission from the first device of the data actually stored in the first device is received by the server in accordance with the schedule.

10 Claims, 4 Drawing Sheets

U.S. PATENT DOCUMENTS

| | | | |
|---|---|---|---|
| 6,925,057 | B2 | 8/2005 | Cheng et al. |
| 6,985,439 | B2 | 1/2006 | Hosein |
| 7,522,923 | B2 | 4/2009 | Fricke et al. |
| 7,610,398 | B2 | 10/2009 | Fricke et al. |
| 2001/0012760 | A1 | 8/2001 | Avis |
| 2001/0028313 | A1 | 10/2001 | McDonnell et al. |
| 2002/0080721 | A1 | 6/2002 | Tobagi et al. |
| 2002/0094815 | A1 | 7/2002 | Kanerva |
| 2002/0138786 | A1 | 9/2002 | Chefalas et al. |
| 2002/0142780 | A1 | 10/2002 | Airy et al. |
| 2002/0167960 | A1 | 11/2002 | Garcia-Luna-Aceves |
| 2003/0026206 | A1 | 2/2003 | Mullendore et al. |
| 2003/0054850 | A1 | 3/2003 | Masseroni et al. |
| 2003/0117955 | A1 | 6/2003 | Cohen et al. |
| 2003/0147361 | A1 | 8/2003 | Tsukidate et al. |
| 2004/0203968 | A1 | 10/2004 | Gopalakrishnan et al. |
| 2004/0248583 | A1 | 12/2004 | Satt et al. |

FOREIGN PATENT DOCUMENTS

| | | | |
|---|---|---|---|
| JP | PUPA-2094846 | | 4/1990 |
| JP | PUPA10-051376 | A | 2/1998 |
| JP | PUPA2001-274741 | A | 10/2001 |
| TW | 512602 | B | 12/2002 |
| TW | 518838 | B | 1/2003 |
| WO | WO0131945 | A1 | 5/2001 |
| WO | WO0203350 | A1 | 1/2002 |

OTHER PUBLICATIONS

Kennedy, Pat; XP-002128907; Mobileweb™ Changing the Face of Mobile Networking Through Universal Wireless Connectivity; pp. 89-94.

International Search Report corresponding to PCT/GB2004/001448, mailed Nov. 30, 2004.

Office Action (Mail Date Apr. 16, 2008) for U.S. Appl. No. 10/552,694, Filing Date Oct. 6, 2006.

May 27, 2008 filed Response to Final Office Action (Mail Date Apr. 16, 2008) for U.S. Appl. No. 10/552,694, Filing Date Oct. 6, 2006.

Final Office Action (Mail Date Nov. 12, 2008) for U.S. Appl. No. 10/552,230, Filing Date Oct. 6, 2006.

Nov. 20, 2008 filed Response to Final Office Action (Mail Date Nov. 12, 2008) for U.S. Appl. No. 10/552,694, Filing Date Oct. 6, 2006.

Notice of Allowance (Mail Date Dec. 12, 2008) for U.S. Appl. No. 10/552,694, Filing Date Oct. 6, 2006.

Office Action (Mail Date Apr. 16, 2008) for U.S. Appl. No. 10/552,230, Filing Date Jun. 30, 2006.

May 29, 2008 filed Response to Office Action (Mail Date Apr. 16, 2008) for U.S. Appl. No. 10/552,230, Filing Date Jun. 30, 2006.

Final Office Action (Mail Date Oct. 21, 2008) for U.S. Appl. No. 10/552,230, Filing Date Jun. 30, 2006.

Dec. 22, 2008 filed Response to Final Office Action (Mail Date Oct. 21, 2008) for U.S. Appl. No. 10/552,230, Filing Date Jun. 30, 2006.

Advisory Action (Mail Date Jan. 12, 2009) for U.S. Appl. No. 10/552,230, Filing Date Jun. 30, 2006.

Jan. 21, 2009 filed Notice of Appeal for U.S. Appl. No. 10/552,230, Filing Date Jun. 30, 2006.

Mar. 23, 2009 filed Appeal Brief for U.S. Appl. No. 10/552,230, Filing Date Jun. 30, 2006.

Supplemental Notice of Allowance (Mail Date Sep. 24, 2009) for U.S. Appl. No. 10/552,230, Filing Date Jun. 30, 2006.

Dec. 14, 2010 Certificate of Correction —Post Issue Communication for U.S. Appl. No. 10/552,230, Filing Date Jun. 30, 2006; Patent No. 7,610,398 B2, issued Oct. 27, 2009.

Profile data 302

Connectivity Profile 103A

Device 100N
Device 100B
Device 100A

| Time | Signal Strength | Position |
|---|---|---|
| 324567 | 150 | 20x30y40z |
| 334790 | 100 | 22x30y42z |

Download profile 103B

Device 100N
Device 100B
Device 100A

| Download time | Size |
|---|---|
| 324567 | 150 |
| Future | 100 |

Figure 2

Plan 306

| Scheduled Time2 | Device | Scheduled download size |
|---|---|---|
| 17:20-17:21 | 100A | 5k |
| 17:21-17:23 | 100B | 10k |
| 17:23-17:26 | 100C | 15k |

Figure 3

SYSTEM FOR DATA LOGGING

This application is a continuation application claiming priority to Ser. No. 10/552,230, filed Jun. 30, 2006, now U.S. Pat. No. 7,610,398 B2, issued Oct. 27, 2009.

BACKGROUND OF THE INVENTION

1. Technical Field

This invention relates to a method and apparatus for data logging.

2. Related Art

Data logging in this specification is the process of collecting data from mobile devices performed in order to obtain business information relating to how the mobile devices operate. For example, position, location and speed of a vehicle over time is useful log data for use in insurance liability calculations for that vehicle. In another example, signal strength of a mobile communication system over both time and position is useful log data to enable a telecommunication company to plan its transmitter locations. Such data is collected by a mobile embedded system using positional information and signal strength information from sources including the network itself (e.g. GSM) and global positioning satellites (GPS). Log data is stored in the mobile embedded system for later transmission to the central system. Transmission is by mobile phone network or other wireless technology.

Transmission of the data log may be performed on demand; when the device is ready it requests control of the transmission channel. Such a system is described in US Patent Publication 6263268 which discloses a mobile automotive telemetry system for installation on-board a vehicle. It includes a diagnostic structure for monitoring operational functions of a vehicle and a server which communicates with the diagnostic structure to receive operational information. The operational information is uploaded to the server when the information is ready.

Another download on demand system, International Patent Publication 02/03350, discloses a method and system for monitoring cellular communication. The method continuously extracts traffic load and speed on roads within the coverage area of a cellular network from a mobile device in a vehicle. The data is extracted directly from the higher level of communication in a cellular network so there is no scheduled or negotiated download of data from the mobile device.

One problem with downloading log data on demand is that it can lead to a conflict situation when several devices are requesting control of a single channel and attempting to download at the same time. Only one request per channel will be successful at any one time and the other requests fail. The failed requests use download resource so that more resource is used for non-ordered requests than for ordered requests. One way to order the downloads is to schedule them to come in at a certain times.

US Patent publication 2001/0028313 discloses a distributed telemetry method and system affected by coordinating the taking of readings of a parameter by mobile phone users, the parameter readings being sent to a service system together with location information on the users. It is the task of a query scheduler to, amongst other things, organise when the reading of interest are to be taken. The reading is sent to the service system immediately or triggered by, for example, a scheduled time.

The problem with scheduled remote data logging is that simultaneous and multiple device upload of data can create overload on a server that collects such log data when the download size is different from that scheduled.

SUMMARY OF THE INVENTION

According to a first aspect of the present invention there is provided a data logging method for transferring data from a plurality of client devices to a server, said method comprising:

building a schedule of transfer periods based on an estimated transfer size for each device;

receiving an actual transfer size for a device;

updating the schedule for all devices with respect to the difference in the received actual transfer size and the corresponding estimated transfer size for said device; and transferring data for said device.

Advantageously said step of building a schedule of transfer periods comprises:

estimating a future transfer size for a device;

calculating a transfer period when the device is scheduled to download its data to the server based on that device's future transfer size estimate and other devices' transfer periods;

storing the transfer periods and a corresponding device reference in a data structure; and performing the above steps with respect to each device.

More advantageously the step of updating the schedule comprises: re-calculating the transfer period for the device based on the actual transfer size.

Preferably the step of updating the schedule further comprises: re-calculating transfer periods of other devices in the schedule if the re-calculated transfer period of said device effects the transfer periods of the other devices.

More preferably, if the originally calculated transfer period differs from the re-calculated transfer period, one or more subsequent transfers may be re-scheduled.

Suitably the future transfer size is an estimate based on a client's historic transfer size.

More suitably the future transfer size is acquired from the client based on the present size of the log data.

Advantageously the future transfer size is an estimate based on the client's historic transfer size and the present size of the log data.

BRIEF DESCRIPTION OF THE DRAWINGS

In order to promote a fuller understanding of this and other aspects of the present invention, an embodiment of the invention will now be described, by means of example only, with reference to the accompanying drawings in which:

FIG. 2 is a schematic diagram of a profile data structure stored by the present embodiment of the invention;

FIG. 3 is a schematic diagram of a plan data structure stored by the present embodiment of the invention.

DETAILED DESCRIPTION OF THE INVENTION

Figure 1:
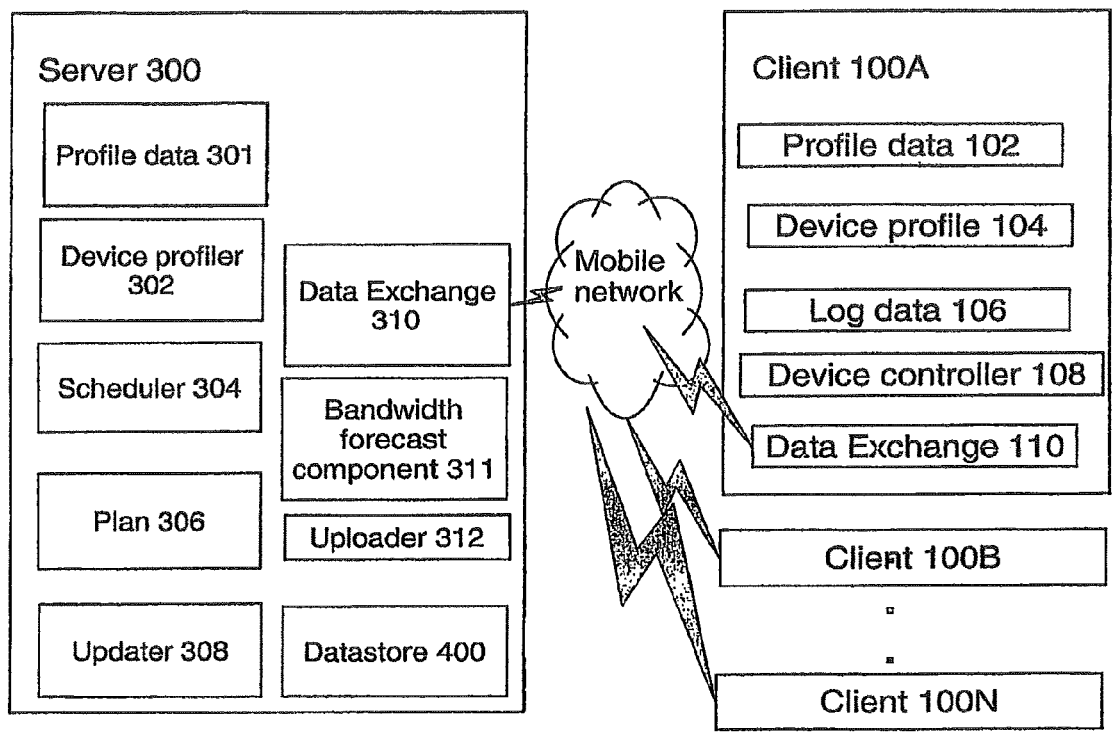
FIG. 1 is a schematic diagram of the present embodiment of the invention.

Referring to FIG. 1 a data logging system comprises: a server 300 connected over a mobile network to a plurality of remote client devices 100A . . . N. The first device is 100A, second device is 100B and so on up to 100N where N is of order a million devices. Each device 100A . . . N comprises: profile data 102; a device profiler 104; a data log 106; a device controller 108; and a data exchange 110. The server 300 comprises: profile data 301; a device profiler 302; a scheduler 304; a plan 306; an updater component 308; data exchange 310; a bandwidth forecast component 311; and an upload component 312. Log data is stored in a datastore 400.

Device profiler 302 maintains each device profile 102 collected from the client devices.

A device profile 102 includes characteristics relating to the device but not the download data itself. Referring to FIG. 2, device profile 102 comprises two profiles for each device in the preferred embodiment: firstly a connectivity profile 103A; and secondly a download profile 103B.

The connectively profile 103A includes GSM radio reception power over time and comprises a data structure having a date and time field and GSM signal field. In a further embodiment the geographical position of the device will be included in the connectivity profile where it is derived from global positioning system (GPS) data or trigonometric data from the GSM receivers. The status of a device is recorded over a week as this is mostly likely to show a pattern. However, in other embodiments, a longer period may be used instead of or as well as. A day of data is normally regarded as the minimum, although theoretically it could be smaller, and three weeks of data gives better averages. More than four weeks of data puts pressure on the storage resource of the device profiler 302.

The quantity of data previously collected allows for at least an estimate to be made of the next quantity of data downloaded. The device profiler 302 provides information to the device scheduler 304 to enable it to establish an estimate for connection time. It also provides information relating to GSM power levels so that unsuitable connection times can be estimated.

The download profile 103B, stores, for each device, a record of each download of data and comprises the time of download and the quantity of data collected in the download.

The scheduler 304 builds the plan 306 by allocating time periods to each specific device based initially on the amount of data that each device is expected to transfer. Device scheduler 304 receives the actual network usage from the data exchange 310 and bandwidth forecast information from component 311. If the scheduler 304 sees that current network usage exceeds or is much less than that used to build the plan 306 then the scheduler 304 updates the plan 306. The device scheduler 304 works to substantially 80% full capacity so that overruns can be catered for and rescheduling work does not continuously replan.

The plan 306 (see FIG. 3) is a data structure that stores a download schedule for each device. Each download for a device is a record in the database having three fields: 1) transfer period (start time and end time); 2) the device identification; and 3) the transfer size.

The updater component 308 keeps a device updated as to its scheduled time by passing messages with the current schedule details and also when relevant changes are made to the plan 306. It keeps track of a device that is off-line and informs the off-line device as soon as it becomes on-line through the data exchange 310.

The update component 308 negotiates with the scheduler 304 in case the device has run out of memory or has not downloaded for an excessive period of time. The scheduler 304 identifies change in the plan 306 and informs the updater component 308 and updates the plan 306 with confirmation from the devices 100A . . . N.

The bandwidth forecast component 311 monitors current download activity from actual data transfers going through the data exchange 310. From this information the present download bandwidth can be monitored and stored for future planning reference. This data is then used to provide a forecast of network capacity for the scheduler 304, which then in turn may choose to throttle back the data transfer by moving devices, or move devices up to take advantage of available bandwidth. In another embodiment the bandwidth component acquires forecast information from a network supplier.

The uploader 312 determines when to update client devices with new software. It takes as input plan 306 to provide an indication of other traffic that may make use of the data communications lines 210, 206. The plan 306 will have an impact on deciding when to upload software to the client devices as each download will reduce the 'effective' communications bandwidth for data upload.

The client device 100A will now be described. Client devices 100B . . . N have the same components and configuration but different identification. Each device 100A . . . N comprises: profile data 102; a device profiler 104; a data log 106; a device controller 108; and a data exchange 110.

The profile data 102, maintained by the device profile component 104, maintains a profile of the device's connectivity and data volumetrics. It is the profile data 102 that is sent to the server 300 to be used in planning and prioritization by scheduler 304.

The data log 106 contains the log data for transfer to the server 300, it also may contain any specific data used by the device controller 108. The key objective is to transfer log data 106 from the client to the datastore 400 via the server 300.

Device controller 108 is responsible for ensuring co-ordination of the log data 106 and controls the download of data to the server 300 and the communication of data volumes. It is the device controller 108 that initiates the data connection and bulk transfer based on the scheduled time received from the server 300. The device controller 108 receives the schedule information from plan 306 via the update component 308. Before the downloading of the log data the device controller 108 establishes communication with the scheduler 304 through update component 308 and the data exchange mechanism 310/110 to check for final adjustments. Ideally each client 100A . . . N would be controlled by the same version of device controller 108 but it may be that some devices have been updated by uploader 312 and others are using an older version. Software updates can be transferred between the server 300 and the clients 100A . . . N along the same communication lines as the data is transferred.

Figure 4:
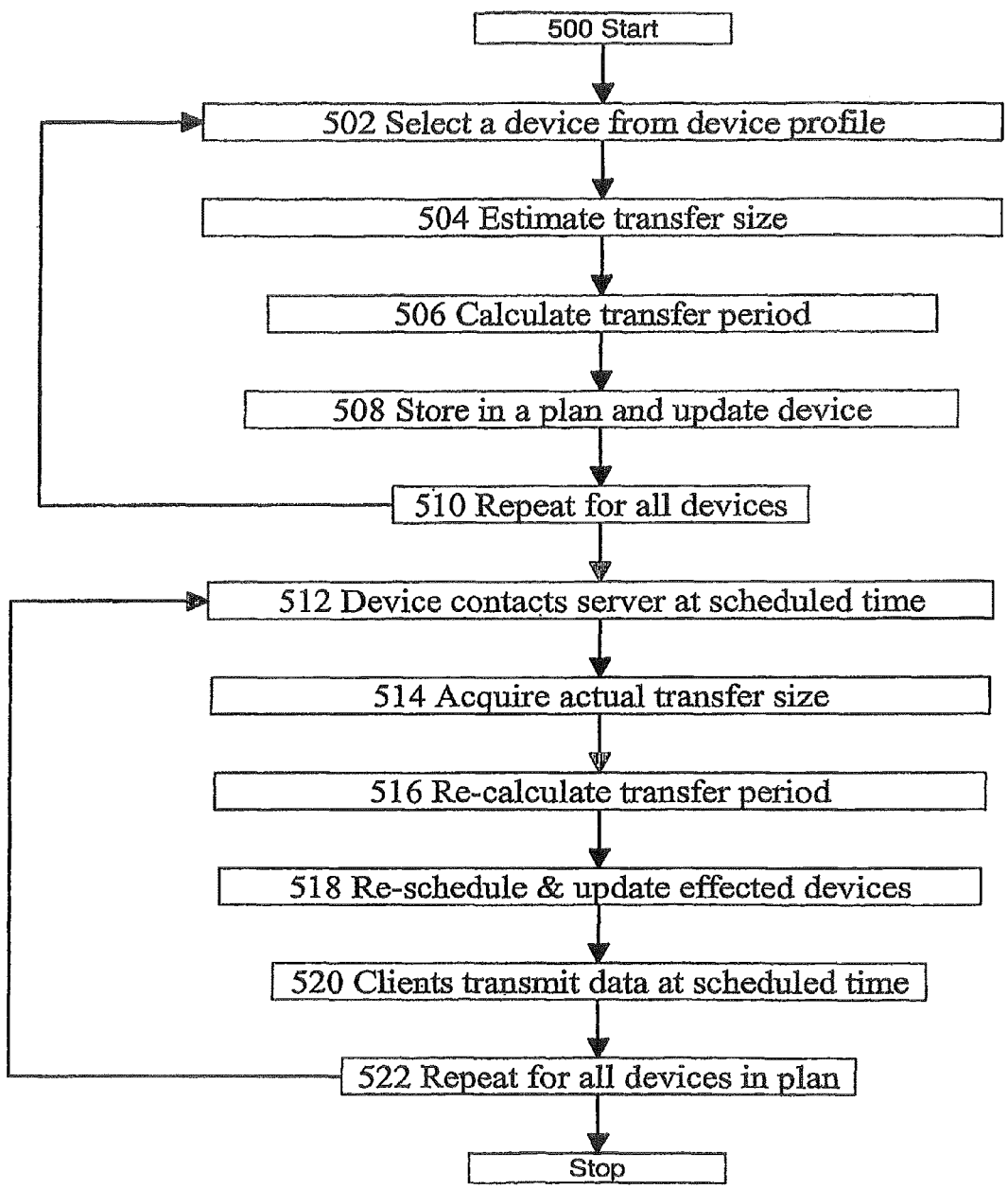
FIG. 4 is a method according to a second embodiment of the present invention.

In the preferred embodiment, the method re-schedules devices in the plan if estimated download sizes differ from the actual download size. Method 500 of this further embodiment is described below with reference to FIG. 4.

The scheduler 304 selects, step 502, a device from the profile data 301. The selection is initially in order of prior transfer size.

The scheduler 304 estimates, step 504, a future transfer size for each device by looking up the download profile of the device and using the previous transfer size. An average of previous transfer sizes may be used.

The scheduler 304 calculates, step 506, a transfer period based on the estimated transfer size.

The estimated transfer period is stored, step 508, in plan 306 and the updater 308 sends the scheduled time to the device via the data exchange mechanism 310.

Step 510 returns the process to step 502 so that steps 502 to 508 are repeated for all devices in the device profile.

Once the plan is completed, each device will have received a scheduled transfer time from the updater 308. Each device will begin the download of log data at the scheduled time. However, the server has to recalculate the scheduled time for some devices if the estimated transfer size is not the same as the actual size.

Prior to transfer, a scheduled device contacts, step 512, the server at the scheduled time with the actual download size.

Scheduler 304 acquires, step 514, the actual transfer size. If the actual transfer size is different from the estimated one then the different transfer period will change the scheduled times of other devices. At step 516, the scheduler 304 re-calculates the transfer periods of a device or devices affected.

The scheduler 304 re-schedules, step 518, the present device if the actual transfer period of the present device is different from what was estimated in the plan. If the transfer period is too long then the next scheduled device will either be pushed forward in time or substituted for a different device having a shorter transfer period. In this embodiment a device with a smaller transfer period is substituted for the next device which advantageously minimizes change to the whole plan 306. In another embodiment the next scheduled device is given a new transfer period which will affect subsequent downloads but retain the original order. If the transfer period is too short there becomes available some free resource, the free resource is filed with a new device having a transfer period which will fill it. In this case it would also be possible to bring forward all the device transfer periods but keeping to substantially the original plan is preferred. In another embodiment the present device itself may be rescheduled in a way which minimizes change to the plan 306.

After or during the previous step, the present client transmits, step 520, its logged data.

The process is repeated, step 522, for all devices in the plan 306.

In the preferred embodiment all the profile data is stored in the server 300 but in another embodiment the data could be stored on the device itself. The profile information is then requested from the device when it is needed. In this other embodiment the data may not be available exactly when it is required so it is not preferred.

The server 300 initially creates a plan 306 for all clients based on a simple staggered algorithm.

Before the initial plan is created, all the device controllers 108 notify the device profiler 302 of the quantity of data to be sent. The updater 308 informs the device controller 108 of the time to connect to the server 300 to transfer data 106.

The profiler 302 will store this profile and pass information on to the dynamic rescheduler 304 which will use the existing plan 306 and if needed adjust the plan and re-notify the client via 308.

The client also sends its profile data 102 via the device profile module 104 to the server device profile 302. The profile data 102 stores the quantity of data gathered per time unit and time of available network coverage.

The scheduler 304 uses historic profile data from the profile data 304 to plan arrival times and connection length to spread the load out during the working day. The optimal plan being to keep a core number of clients communicating but not to overload the system. To do this known data volumes sent by the client scheduler 108 and the predicted volumes from the device profiler 302 are used. This information is used along with the actual and predicted network band with (from 310 bandwidth forecaster).

Although the embodiments have been described in terms of a single server it is possible to scale the solution up to two or more servers.

What is claimed is:

1. A system comprising a computer and a computer-readable physically tangible storage device coupled to the computer, said storage device storing computer readable program instructions that when loaded into a computer and executed causes the computer to performs a method that utilizes a schedule of data transfer periods during which data is transferred from a plurality of client devices to a server over a network, said method comprising for a first device of the plurality of devices:

obtaining, by the server, from the first device a communication of an actual data transfer size of data actually stored in the first device;

estimating, by the server, a corresponding future data transfer size of the data actually stored in the first device, said estimating being based on a historic data transfer size for data previously transferred from the first device to the server over the network, said schedule currently being based on the historic data transfer size for the first device;

determining, by the server, that a difference exists between the actual data transfer size and the corresponding estimated future data transfer size;

responsive to said determining that said difference exists, changing an existing data transfer period for the first device in the schedule in a way that minimizes change to the schedule;

receiving, by the server, a transmission over the network from the first device of the data actually stored in the first device, said transmission being received in accordance with the schedule resulting from said changing the existing data transfer period for the first device;

keeping track, by the server, of an off-line device of the plurality of devices that is off-line and informing the off-line device of the off-line device's schedule for transferring data from the off-line device to the server as soon as the off-line device becomes on-line;

receiving, by the server, information relating to GSM radio reception power over time by a another device of the plurality of devices and estimating, by the server based on the received information relating to the GSM power, times unsuitable for the another device to be connected to the server;

said server forecasting a bandwidth of the network by monitoring current download activity from data transfers between the network and said server;

revising the schedule to achieve data transfer from the plurality of devices to the server at 80% of the forecasted bandwidth;

changing, by the server, the schedule in response to detecting that a device of the plurality of devices has run out of memory;

determining, by the server, when to upload new software from the server to the plurality of devices, taking into account a reduction in an effective communications bandwidth, said reduction resulting from the data transferred from the plurality of devices to the server.

2. The system of claim 1, wherein said actually updating does not change an order of the devices in the schedule.

3. The system of claim 1, wherein the actual data transfer size exceeds the corresponding estimated future data transfer size and said actually updating comprises replacing the existing data transfer period of the first device in the schedule with a data transfer period of a second device of the plurality of devices, and wherein a duration of the data transfer period of the second device in the schedule is less than a duration of the new data transfer period of the first device.

4. The system of claim 1, wherein the actual data transfer size for the first device exceeds the corresponding future estimated data transfer size for the first device and said actually updating comprises having the new data transfer period for the first device begin at an earlier time in the schedule.

5. The system of claim 1, wherein the actual data transfer size for the first device is less than the corresponding estimated transfer size for the first device so as to create a free time slot in the schedule and said actually updating comprises filling the free time slot with a data transfer period of a second device of the plurality of devices.

6. A computer program product comprising computer program instructions stored on a computer-readable physically tangible storage device, said computer readable program instructions, when loaded into a computer and executed, performs a method that utilizes a schedule of data transfer periods during which data is transferred from a plurality of client devices to a server over a network, said method comprising for a first device of the plurality of devices:

obtaining, by the server, from the first device a communication of an actual data transfer size of data actually stored in the first device;

estimating, by the server, a corresponding future data transfer size of the data actually stored in the first device, said estimating being based on a historic data transfer size for data previously transferred from the first device to the server over the network, said schedule currently being based on the historic data transfer size for the first device;

determining, by the server, that a difference exists between the actual data transfer size and the corresponding estimated future data transfer size;

responsive to said determining that said difference exists, changing an existing data transfer period for the first device in the schedule in a way that minimizes change to the schedule;

receiving, by the server, a transmission over the network from the first device of the data actually stored in the first device, said transmission being received in accordance with the schedule resulting from said changing the existing data transfer period for the first device;

keeping track, by the server, of an off-line device of the plurality of devices that is off-line and informing the off-line device of the off-line device's schedule for transferring data from the off-line device to the server as soon as the off-line device becomes on-line;

receiving, by the server, information relating to GSM radio reception power over time by a another device of the plurality of devices and estimating, by the server based on the received information relating to the GSM power, times unsuitable for the another device to be connected to the server;

said server forecasting a bandwidth of the network by monitoring current download activity from data transfers between the network and said server;

revising the schedule to achieve data transfer from the plurality of devices to the server at 80% of the forecasted bandwidth;

changing, by the server, the schedule in response to detecting that a device of the plurality of devices has run out of memory;

determining, by the server, when to upload new software from the server to the plurality of devices, taking into account a reduction in an effective communications bandwidth, said reduction resulting from the data transferred from the plurality of devices to the server.

7. The computer program product of claim 6, wherein said actually updating does not change an order of the devices in the schedule.

8. The computer program product of claim 6, wherein the actual data transfer size exceeds the corresponding estimated future data transfer size and said actually updating comprises replacing the existing data transfer period of the first device in the schedule with a data transfer period of a second device of the plurality of devices, and wherein a duration of the data transfer period of the second device in the schedule is less than a duration of the new data transfer period of the first device.

9. The computer program product of claim 6, wherein the actual data transfer size for the first device exceeds the corresponding future estimated data transfer size for the first device and said actually updating comprises having the new data transfer period for the first device begin at an earlier time in the schedule.

10. The computer program product of claim 6, wherein the actual data transfer size for the first device is less than the corresponding estimated transfer size for the first device so as to create a free time slot in the schedule and said actually updating comprises filling the free time slot with a data transfer period of a second device of the plurality of devices.

* * * * *